US008516537B2

(12) United States Patent
Kelma et al.

(10) Patent No.: US 8,516,537 B2
(45) Date of Patent: Aug. 20, 2013

(54) DOWNSTREAM BANDWIDTH CONDITIONING DEVICE (75) Inventors: David Kelma, Madisonville, TN (US); Tab Kendall Cox, Baldwinsville, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 966 days.

(21) Appl. No.: 12/576,461

(22) Filed: Oct. 9, 2009

(65) Prior Publication Data
US 2011/0088077 A1 Apr. 14, 2011

(51) Int. Cl.
*H04N 7/16* (2011.01)
(52) U.S. Cl.
USPC .......................................... 725/149; 725/148
(58) Field of Classification Search
USPC .................................................. 725/148, 149
See application file for complete search history.

(56) References Cited

U.S. PATENT DOCUMENTS

| | | | |
|---|---|---|---|
| 3,790,909 A | 2/1974 | Le Fevre | |
| 4,418,424 A * | 11/1983 | Kawamoto et al. | 725/149 |
| 4,512,033 A | 4/1985 | Schrock | |
| 4,520,508 A | 5/1985 | Reichert, Jr. | |
| 4,648,123 A | 3/1987 | Schrock | |
| 4,677,390 A | 6/1987 | Wagner | |
| 4,961,218 A | 10/1990 | Kiko | |
| 4,982,440 A | 1/1991 | Dufresne et al. | |
| 5,010,399 A | 4/1991 | Goodman et al. | |
| 5,126,840 A | 6/1992 | Dufresne et al. | |
| 5,214,505 A | 5/1993 | Rabowsky et al. | |
| 5,231,660 A | 7/1993 | West, Jr. | |
| 5,235,612 A | 8/1993 | Stilwell et al. | |
| 5,345,504 A * | 9/1994 | West, Jr. | 380/205 |
| 5,361,394 A | 11/1994 | Shigihara | |
| 5,369,642 A | 11/1994 | Shioka et al. | |
| 5,548,255 A | 8/1996 | Spielman | |
| 5,745,836 A | 4/1998 | Williams | |
| 5,815,794 A | 9/1998 | Williams | |

(Continued)

FOREIGN PATENT DOCUMENTS

| | | | |
|---|---|---|---|
| JP | 55080989 A | 6/1980 | |
| JP | 55132126 A | 10/1980 | |

(Continued)

OTHER PUBLICATIONS

International Searching Authority/US, International Search and Written Opinion dated Dec. 18, 2009 (6 pgs).

*Primary Examiner* — Robert Hance
(74) *Attorney, Agent, or Firm* — Schmeiser, Olsen & Watts LLP (57) ABSTRACT A downstream bandwidth conditioning device includes a forward path. A coupler is connected within the forward path providing a secondary path. A tuner connected to the coupler is tunable based on an input from a microprocessor. The tuner provides a tuner output of a selected channel, the selected channel being at least one high frequency channel and one low frequency channel. A channel analyzer connected to an output of the tuner provides the microprocessor with a modulation output that differs when the selected channel is an analog modulation versus a digital modulation. A slope adjustment circuit connected within the forward path between the coupler and the supplier side connector is adjustable based on an slope control output provided by the microprocessor. An output compensation circuit connected within the forward signal path between the coupler and the supplier side connector is adjustable based on a level control output from the microprocessor.

8 Claims, 7 Drawing Sheets

(56) References Cited

U.S. PATENT DOCUMENTS

| | | | |
|---|---|---|---|
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,970,053 A | 10/1999 | Schick et al. |
| 6,014,547 A * | 1/2000 | Caporizzo et al. ............ 725/151 |
| 6,049,693 A | 4/2000 | Baran et al. |
| 6,069,960 A | 5/2000 | Mizukami et al. |
| 6,094,211 A | 7/2000 | Baran et al. |
| 6,160,990 A | 12/2000 | Kobayashi et al. |
| 6,205,138 B1 | 3/2001 | Nihal et al. |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,495,998 B1 | 12/2002 | Terreault |
| 6,498,925 B1 | 12/2002 | Tauchi |
| 6,510,152 B1 | 1/2003 | Gerszberg et al. |
| 6,560,778 B1 | 5/2003 | Hasegawa |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,725,463 B1 * | 4/2004 | Birleson ............ 725/151 |
| 6,728,968 B1 | 4/2004 | Abe et al. |
| 6,757,910 B1 | 6/2004 | Bianu |
| 6,804,828 B1 | 10/2004 | Shibata |
| 6,845,232 B2 | 1/2005 | Darabi |
| 6,877,166 B1 | 4/2005 | Roeck et al. |
| 6,880,170 B1 | 4/2005 | Kauffman et al. |
| 6,928,175 B1 | 8/2005 | Bader et al. |
| 7,003,275 B1 | 2/2006 | Petrovic |
| 7,029,293 B2 | 4/2006 | Shapson et al. |
| 7,039,432 B2 | 5/2006 | Strater et al. |
| 7,162,731 B2 | 1/2007 | Reidhead et al. |
| 7,283,479 B2 | 10/2007 | Ljungdahl et al. |
| 7,454,252 B2 | 11/2008 | El-Sayed |
| 7,505,819 B2 | 3/2009 | El-Sayed |
| 7,530,091 B2 | 5/2009 | Vaughan |
| 7,603,693 B2 | 10/2009 | Masuda et al. |
| 7,742,777 B2 | 6/2010 | Strater et al. |
| 7,748,023 B2 | 6/2010 | Weinstein et al. |
| 8,001,579 B2 | 8/2011 | Olson et al. |
| 2001/0016950 A1 | 8/2001 | Matsuura |
| 2002/0141347 A1 | 10/2002 | Harp et al. |
| 2002/0141494 A1 | 10/2002 | Chappell |
| 2002/0144292 A1 | 10/2002 | Uemura et al. |
| 2002/0166124 A1 | 11/2002 | Gurantz et al. |
| 2002/0174435 A1 | 11/2002 | Weinstein et al. |
| 2004/0172659 A1 | 9/2004 | Ljungdahl et al. |
| 2004/0229561 A1 | 11/2004 | Cowley et al. |
| 2005/0034168 A1 | 2/2005 | Beveridge |
| 2005/0155082 A1 | 7/2005 | Weinstein et al. |
| 2005/0183130 A1 | 8/2005 | Sadja et al. |
| 2005/0283815 A1 | 12/2005 | Brooks et al. |
| 2005/0289632 A1 | 12/2005 | Brooks et al. |
| 2006/0015921 A1 | 1/2006 | Vaughan |
| 2006/0148406 A1 | 7/2006 | Strater et al. |
| 2006/0205442 A1 | 9/2006 | Phillips et al. |
| 2006/0282871 A1 | 12/2006 | Yo |
| 2007/0288981 A1 | 12/2007 | Mitsuse et al. |
| 2007/0288982 A1 | 12/2007 | Donahue |
| 2008/0022344 A1 | 1/2008 | Riggsby |
| 2008/0040764 A1 | 2/2008 | Weinstein et al. |
| 2008/0127287 A1 | 5/2008 | Alkan et al. |
| 2009/0031391 A1 | 1/2009 | Urbanek |
| 2009/0047917 A1 | 2/2009 | Phillips et al. |
| 2009/0077608 A1 | 3/2009 | Romerein et al. |
| 2009/0316608 A1 | 12/2009 | Singh et al. |
| 2010/0100912 A1 | 4/2010 | Olson et al. |
| 2010/0100921 A1 | 4/2010 | Olson et al. |
| 2010/0266000 A1 | 10/2010 | Froimovich et al. |
| 2011/0085452 A1 | 4/2011 | Kelma et al. |
| 2011/0085480 A1 | 4/2011 | Kelma et al. |
| 2011/0085586 A1 | 4/2011 | Kelma et al. |

FOREIGN PATENT DOCUMENTS

| | | |
|---|---|---|
| JP | 57091055 A | 6/1982 |
| JP | 58101582 U | 6/1983 |
| JP | 05899913 | 7/1983 |
| JP | 61157035 A | 7/1986 |
| JP | 05191416 A | 7/1993 |
| JP | 07038580 A | 2/1995 |
| JP | 11069334 A | 3/1999 |
| JP | 2001177580 A | 6/2001 |
| JP | 2004080483 A | 3/2004 |
| JP | 2005005875 A | 1/2005 |
| JP | 2007166109 A | 6/2007 |
| JP | 2007166110 A | 6/2007 |
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |

* cited by examiner

DOWNSTREAM BANDWIDTH CONDITIONING DEVICE

FIELD OF THE INVENTION

The present invention relates generally to signal conditioning devices for use in community antenna television ("CATV") systems, and in particular to signal conditioning devices that condition a downstream bandwidth in a CATV system.

BACKGROUND OF THE INVENTION

The use of a CATV system to provide internet, voice over internet protocol ("VOIP") telephone, television, security, and music services is well known in the art. In providing these services, a downstream bandwidth (i.e., radio frequency ("RF") signals, digital signals, and/or optical signals) is passed from a supplier of the services to a user, and an upstream bandwidth (i.e., radio frequency ("RF") signals, digital signals, and/or optical signals) is passed from the user to the supplier. For much of the distance between the supplier and the user, the downstream bandwidth and the upstream bandwidth make up a total bandwidth that is passed via a signal transmission line, such as a coaxial cable. The downstream bandwidth is, for example, signals that are relatively higher in frequency within the total bandwidth of the CATV system while the upstream bandwidth is, for example, signals that are relatively lower in frequency.

Traditionally, the CATV system includes a head end facility, where the downstream bandwidth is initiated into a main CATV distribution system, which typically includes a plurality of trunk lines, each serving at least one local distribution network. In turn, the downstream bandwidth is passed to a relatively small number (e.g., approximately 100 to 500) of users associated with a particular local distribution network. Devices, such as high-pass filters, are positioned at various points within the CATV system to ensure the orderly flow of downstream bandwidth from the head end facility, through the trunk lines, through the local distribution networks, and ultimately to the users.

At various locations between the head end facility and the user, there are amplifiers and slope adjustment devices for the purpose of maintaining the quality of the downstream bandwidth. This statement introduces three terms (i.e., quality, amplifiers, and slope adjustment devices) that are important to the remaining discussion. These will be discussed broadly below.

The quality of the downstream bandwidth is often a measure of: (i) a signal level of a particular channel within the downstream bandwidth, the signal level referred to merely as "level;" and (ii) a general consistency of levels across all of the channels in the downstream bandwidth, the general consistency referred to as "slope." These objective measurements are often used by technicians to evaluate CATV system performance during operation and to troubleshoot customer complaints.

The level of each channel should fall within a specific range that has been determined to provide satisfactory video, sound and information transfer rates for users. The specific requirements for each channel are not of importance to the present discussion, but it is helpful to understand that are specific targets for the level of each channel. Note that this is a simplistic definition to explain "level," and note that this definition does not include other variances such as between analog and digital.

Slope is measurement used to assess the amount of loss experienced due in large part to cable length. While all channels experience some loss, channels transmitted using higher frequencies within the downstream bandwidth experience more loss than those transmitted using lower frequencies. Accordingly, when the levels for all of the channels within the downstream bandwidth are graphed such that they are arranged in order according to the frequency of the channel, there may be a significant visual downward slope in the graph from the lowest frequency channel to highest frequency channel. This downward slope becomes more prominent as the length of signal cable increases. Note that this is a simplistic definition to explain the consistency of levels across all of the channels and the "slope" that is created by losses occurring in the signal cables. Also note that this definition does not include other variances such as between analog and digital.

The presence of slope is not removed through the use of typical drop-style amplifiers. The drop-style amplifiers merely amplify the entire downstream bandwidth. In other words, these drop-style amplifiers raise the level of each channel equally. In turn, if there is a large amount of slope present, such as when a user's premise includes long distances of signal cable, the drop-style amplifier may cause some channels to exceed their level specification while other channels may remain below their specification.

It is known to add a fixed or manually adjustable slope compensator/low frequency attenuator when there is a long run of signal cable. However, these devices require expensive testing equipment to determine whether and/or how much slope compensation should be supplied to a particular premise. Further, due to the cost of installation and a general misunderstanding regarding how to install such devices, there are relatively few in existence, compared to the number of such devices needed.

For at least the forgoing reasons, a need is apparent for a device, which can increase the overall quality of the downstream bandwidth that includes providing an appropriate amount of amplification and an appropriate amount of slope compensation increasing the signal strength and increasing the signal-to-noise ratio.

SUMMARY OF THE INVENTION

The present invention helps to increase the quality of the downstream bandwidth. Increasing the quality of the downstream bandwidth improves customer satisfaction and reduces expenditures relating to customer complaints.

In accordance one embodiment of the present invention, a downstream bandwidth conditioning device is provided that can be inserted into a transmission line of a CATV system on or proximate to a premise of a user. The device includes a forward path extending at least a portion of a distance between a supplier side connector and user side connector. A coupler is connected within the forward path, the coupler providing a secondary path. A tuner is connected to the coupler and is tunable based on an input from a microprocessor. The tuner provides a tuner output of a selected channel, the selected channel being at least one of a high frequency channel and a one low frequency channel. A channel analyzer is connected to an output of the tuner. The channel analyzer provides the microprocessor with a modulation output. The modulation output differs when the selected channel is an analog modulation versus when the selected channel is a digital modulation. A slope adjustment circuit is connected within the forward path between the coupler and the supplier side connector. The slope adjustment device is adjustable based on an slope control output provided by the microprocessor. An output compensation circuit is electrically connected within the forward signal path between the coupler and the supplier side connector. The output compensation device is adjustable based on a level control output from the microprocessor.

In accordance with one embodiment of the present invention, a method is provided for conditioning a downstream bandwidth on or proximate to a premise of a user of CATV services. The method includes initiating a first mode. The first mode includes tuning to an initial high frequency channel from a downstream bandwidth, and obtaining a high channel modulation and a high channel level from the initial high frequency channel. The method further includes tuning to an initial low frequency channel from the downstream bandwidth, and obtaining a low channel modulation and a low channel level from the initial low frequency channel. The method further includes providing an amount of level adjustment of the downstream bandwidth, and providing an amount of slope adjustment of the downstream bandwidth.

BRIEF DESCRIPTION OF THE DRAWINGS

For a further understanding of the nature and objects of the invention, references should be made to the following detailed description of a preferred mode of practicing the invention, read in connection with the accompanying drawings in which.

DETAILED DESCRIPTION OF THE INVENTION

Figure 1:
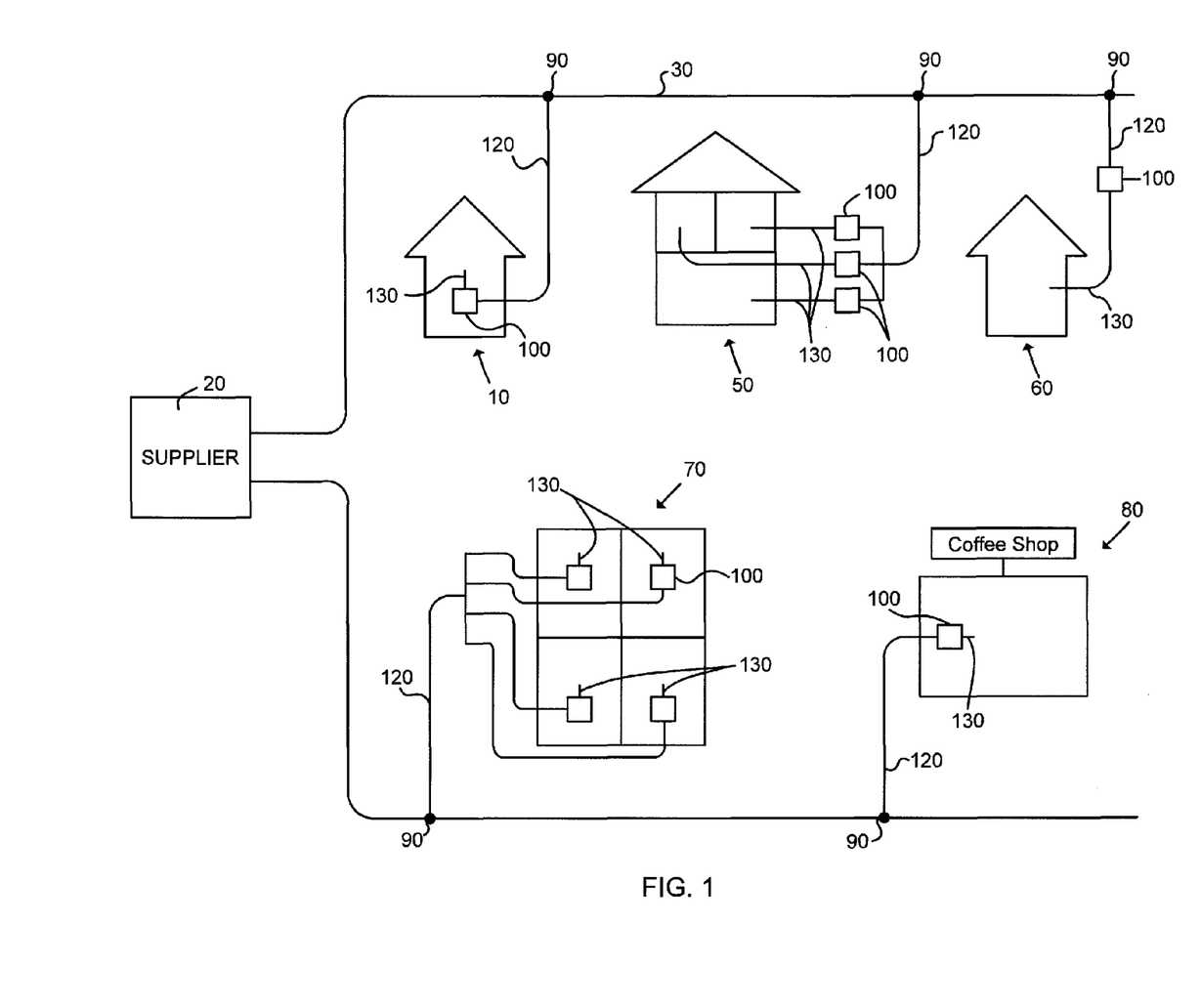
FIG. 1 is a graphical representation of a CATV system arranged in accordance with an embodiment of the present invention.

As shown in FIG. 1, a CATV system typically includes a supplier 20 that transmits a downstream bandwidth, such as RF signals, digital signals, and/or optical signals, to a user through a main distribution system 30 and receives an upstream bandwidth, such as RF signals, digital signals, and/or optical signals, from a user through the same main signal distribution system 30. A tap 90 is located at the main signal distribution system 30 to allow for the passage of the downstream/upstream bandwidth from/to the main signal distribution system 30. A drop transmission line 120 is then used to connect the tap 90 to a house 10, 60 an apartment building 50, 70, a coffee shop 80, and so on. As shown in FIG. 1, a downstream bandwidth conditioning device 100 ("downstream device 100") of the present invention may be connected in series between the drop transmission line 120 and a user's premise distribution system 130.

Referring still to FIG. 1, it should be understood that the downstream device 100 can be placed at any location between the tap 90 and the user's premise distribution system 130. This location can be conveniently located within the premise (e.g., the house 10, the apartment building 70, etc.), or proximate to the premise (e.g., the house 60, the apartment building 50, etc.). It should be understood that the downstream device 100 can be placed at any location, such as the coffee shop 80 or other business, where CATV services, including internet services, VOIP services, or other unidirectional/bidirectional services are being used.

Figure 2:
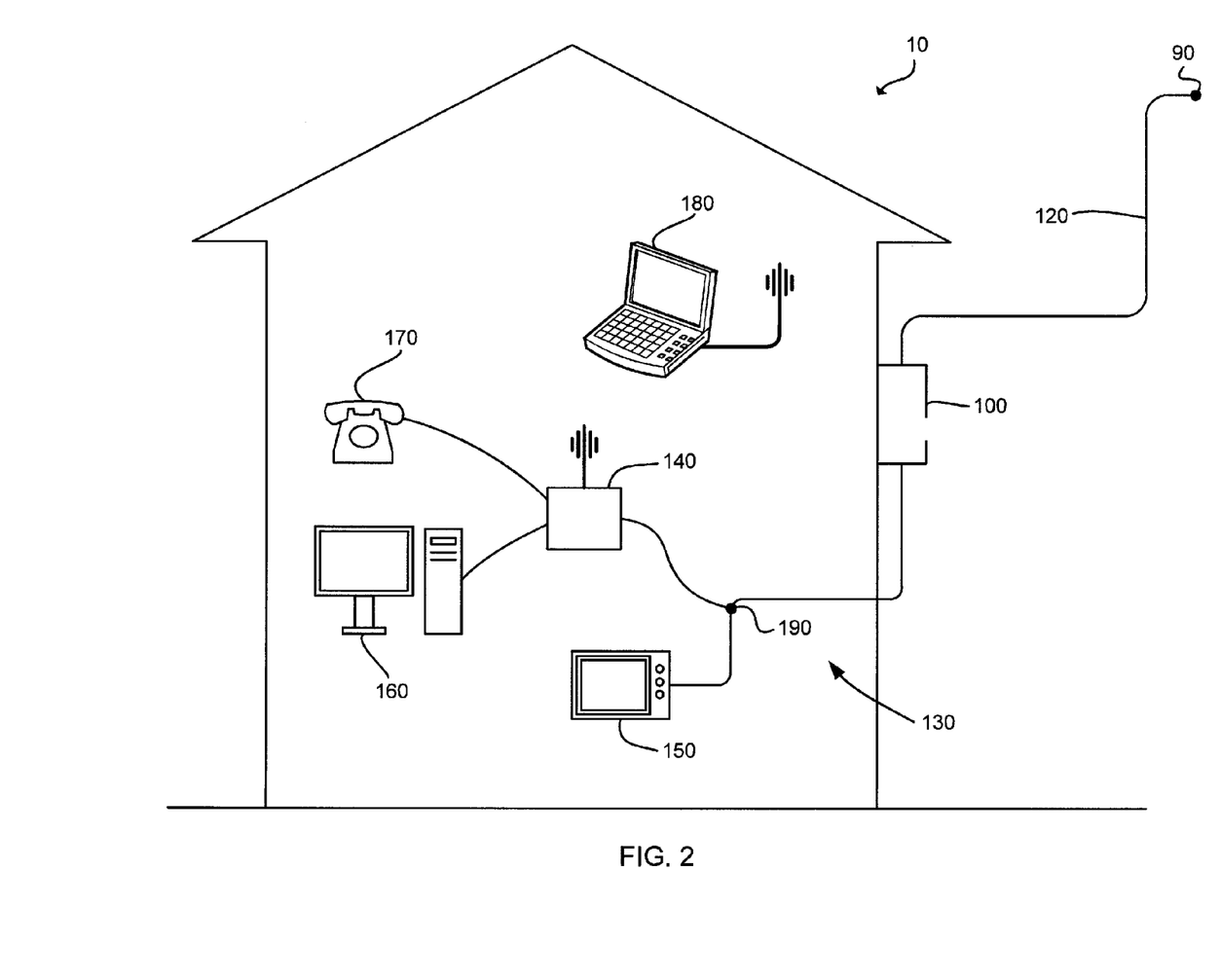
FIG. 2 is a graphical representation of a user's premise arranged in accordance with an embodiment of the present invention.

As shown in FIG. 2, the user's premise distribution system 130 may be split using a splitter 190 so that downstream/upstream bandwidth can pass to/from a television 150 and a modem 140 in accordance with practices well known in the art. The modem 140 may include VOIP capabilities affording telephone 170 services and may include a router affording internet services to a desktop computer 160 and a laptop computer 180, for example.

Further, while not shown explicitly in FIG. 2, there may be two (or more) downstream devices 100 located within or proximate to a single premise. For example, there may be a downstream device 100 located between the modem 140 and the splitter 190 and another downstream device 100 located between the television 150 and the splitter 190. Similarly, there may be a downstream device 100 located at any point in the premise distribution system 130 where an upstream bandwidth is being passed (e.g., from a modem, a STB, a STU, a VOIP server, etc.).

Further, while not shown explicitly in FIG. 2, there may be one downstream device 100 located proximate to two user premises when there is one drop transmission line 120 used to connect the tap 90 to both of the two user premises. Such an arrangement may be necessary when the two premises are located too closely to one another for the physical placement of separate downstream devices 100.

It should be understood that the goal of placing the downstream device 100 into one of the locations described above is to increase the overall quality of the downstream bandwidth reaching the devices in the premise. Because a significant portion of signal quality is lost due to lengths of signal cable, connectors, and splitters, any time that these are reduced by placing the downstream device 100 closer to an end device will result in additional signal quality.

Figure 3:
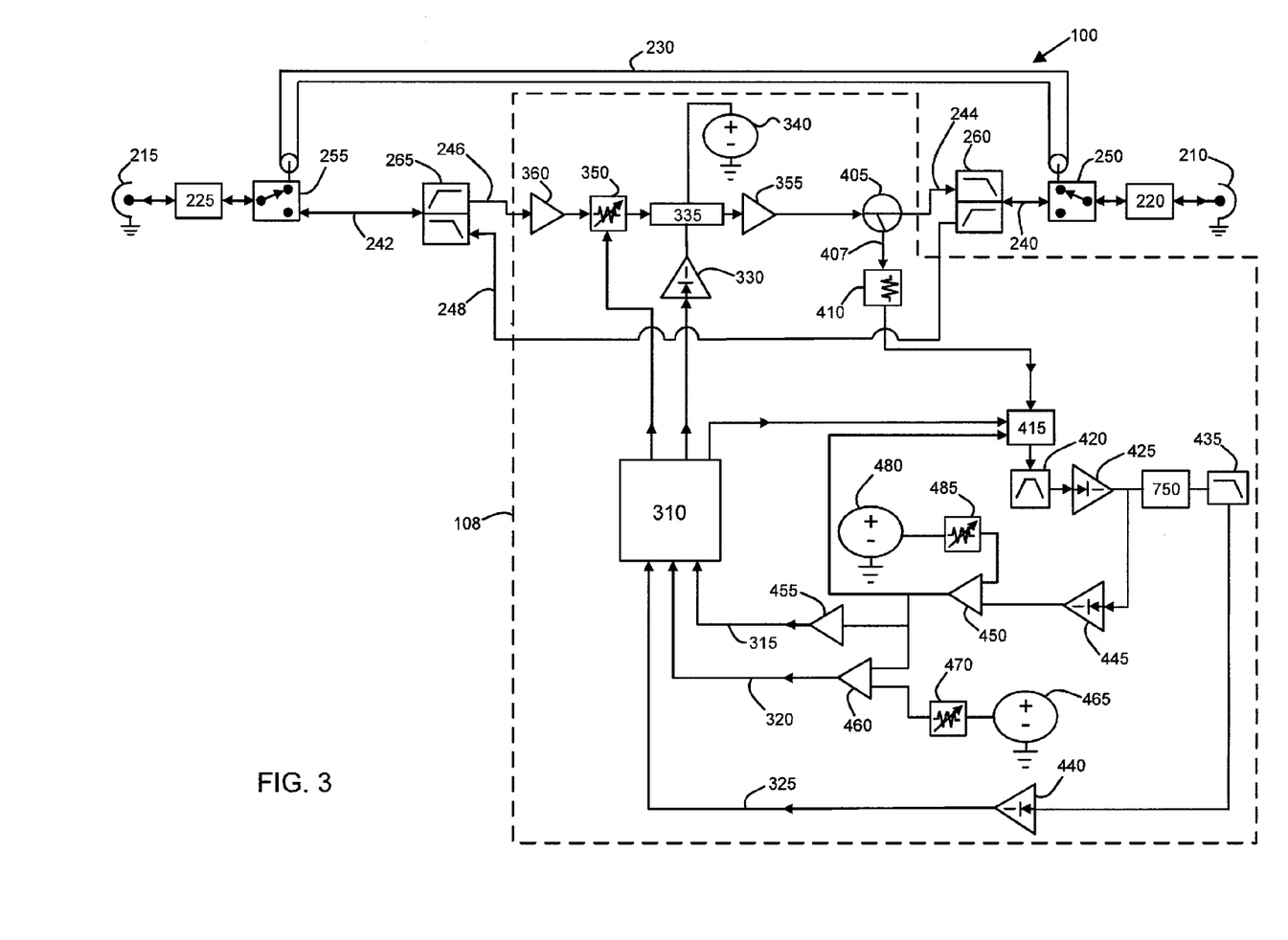
FIG. 3 is a circuit diagram representing a downstream device including a downstream section made in accordance with one embodiment of the present invention.

Referring now to FIG. 3, the discussion of the downstream device 100 will be broken down into two general topics of discussion, general components and a downstream bandwidth conditioning section 108 ("downstream section 108"). The general components will be discussed first to develop the terminology used throughout and to help explain how the downstream bandwidth passes through to the downstream section 108. The hardware, the operation, and the control of the downstream section 108 will be discussed thereafter.

Referring still to FIG. 3, the downstream device 100 may include a user side connector 210 and a supplier side connector 215. Each of these connectors 210, 215 may be any of the connectors used in the art for connecting a signal cable to a device. For example, each of the user side connector 210 and the supplier side connector 215 may be a traditional female "F-type" connector.

A user side surge protector 220 and a supplier side surge protector 225 may be provided electrically adjacent the user side connector 210 and the supplier side connector 215, respectively. This positioning of the surge protectors 220, 225 allows for the protection of electrically fragile components (discussed more fully below) positioned between the surge protectors 220, 225. Each of the user side surge protector 220 and the supplier side surge protector 225 may be any of the surge protectors known in the art for electronic applications.

A user side switch 250 and a supplier side switch 255 each have two positions. In a first, default position (shown in FIG. 3), the switches 250, 255 pass signals through a bypass path 230. In a second position, the user side switch 250 and the supplier side switch 255 electrically connect the user side connector 210 to a user side main path 240 and the supplier side connector 215 to the a supplier side main path 242, respectively. As will be discussed further below, the primary components of the downstream device 100 are electrically connected in series between the user side main path 240 and the supplier side main path 242.

The switches 250, 255 allow the total bandwidth to pass through the bypass path 230 in the event of a fault within the upstream bandwidth conditioning device 100, such as an electrical power failure. The switches 250, 255 may be any of the SPDT (Single Pole Double Throw) switches known in the art. For example the switches 250, 255 may be selected and installed such that when there is no electrical power present to the downstream device 100, the switches 250, 255 automatically select the first, default position to pass the total bandwidth through the bypass path 230. Conversely, when there is electrical power present, the switches 250, 255 move toward their second position passing the total bandwidth to the main paths 240, 242. In the event of an electrical short within the downstream device 100, it is likely that the short will cause additional current flow that will ultimately result in the destruction of a fuse or in the opening of another circuit breaker type device (not shown). Accordingly, such a short will likely result in a loss of power to switches allowing the total bandwidth to pass through the bypass path 230.

A microprocessor 310 (discussed more fully below) may also be used to actuate the switches 250, 255 to their first position (i.e., to the bypass path 230) when a fault, other than an electrical power loss, is detected within the downstream device 100. While the circuitry for such a connection is not shown in FIG. 3, it should be understood that the control by the microprocessor 310 may be in addition to the switches 250, 255 automatic positioning due to an electrical failure.

The term "microprocessor" used throughout should be understood to include all active circuits capable of performing the functions discussed herein. For example, the microprocessor 310 may be replaced with a microcontroller, a system specific digital controller, or a complex analog circuit.

The bypass path 230 may be a coaxial cable, an unshielded wire, and/or a metallic trace on a circuit board. All of these options are capable of passing the total bandwidth with little signal attenuation.

A user side diplexer 260 and a supplier side diplexer 265 are electrically coupled to the user side main path 240 and the supplier side main path 242, respectfully. The diplexers 260, 265 are arranged and configured to create a forward path 244, 246 and a return path 248 there between. Each of the diplexers 260, 265 may function like combination of a splitter, a high-pass filter, and a low-pass filter, the splitter dividing the respective main path 240, 242 into two signal paths, one for each of the low-pass filter and the high-pass filter. Using the terms of this combination, each of the high-pass filters passes the downstream bandwidth, and each of the low-pass filters passes the upstream bandwidth. In the present example, the upstream bandwidth passes along the return path 248 between the diplexers 260, 265. Of particular importance to the present downstream device 100, the downstream bandwidth passes along the forward path 244, 246 between the diplexers 260, 265. The remainder of the description below focuses on the hardware, the operation, and the control of the downstream section 108 attached within the forward path 244, 246.

In an effort to set the stage for the following discussion, the hardware, the operation, and the control of the downstream section 108 will be first described here in very general detail. For example, the microprocessor 310 seeks and observes channel level data using two different modes of operation, Mode Ø and Mode 1. In Mode Ø, the microprocessor 310 uses only a single high frequency channel and single low frequency channel to make relatively course/large corrections in terms of level and slope. In Mode 1, the microprocessor 310 uses an average of more than one high frequency channel and an average of more than one low frequency channels to make relatively fine corrections in terms of level and slope. In each Mode, the level of the high frequency channel(s) is used to set the amplification, while the level of the low frequency channel(s) is used to set the slope. The hardware, control, and operation of the downstream section 108 will be discussed in further detail below.

Beginning first with the hardware, a coupler 405 is connected within the forward path 244 to pass a portion of the downstream bandwidth (referred to herein as a coupled downstream bandwidth) via a secondary path 407 toward a tuner 415. The coupler 405 is positioned within the forward path 244 between the user side diplexer 260 and functional components (e.g., amplifiers 355, 360, a variable attenuator 350, and a slope adjustment device 335, all discussed in further detail below) that are used to condition the downstream bandwidth by correcting the level and slope of the downstream bandwidth. This positioning of the coupler 405 allows the downstream bandwidth to be sampled and analyzed after it has been conditioned. The coupler 405 used in the present embodiment is a traditional directional coupler to endure a continuous characteristic impedance. Other devices, such as a simple resistor, and/or a splitter may be used with careful consideration of the effects that these alternatives may have on the characteristic impedance of the device.

The term "connected" is used throughout to mean optically or electrically positioned such that current, voltages, and/or light are passed between the connected components. It should be understood that the term "connected" does not exclude the possibility of intervening components or devices between the connected components. For example, the tuner 415 is connected to the coupler 405 even though a fixed signal level adjustment device 410 is shown to be positioned in an intervening relation between the tuner 415 and the coupler 405.

The terms "connected electrically downstream" and "connected electrically upstream" may also be used throughout to aid in the description regarding where or how the two components are connected. As an example, when a second device is connected electrically downstream from a first device, the second device receives signal from the first device. This same arrangement could also be described as having the first device connected electrically upstream from the second device.

The fixed signal level adjustment device 410 may be positioned between the coupler 405 and the tuner 415. The fixed signal level adjustment device 410 may be used to prevent the coupler 405 from drawing too much power from the downstream bandwidth. Further, the fixed signal level adjustment device 410 may be sized to provide the tuner 415 with the coupled downstream bandwidth having an appropriate amount of power for the tuner 415 and subsequent devices. Accordingly, one skilled in the art would understand, based on the present disclosure, whether the fixed signal level adjustment device 410 is required and what size of the fixed signal level adjustment device 410 is required for any particular coupler 405 and tuner 415 combinations.

The tuner 415 is a traditional tuner device that can be "tuned" to selected channels based on an input from the microprocessor 310. In particular the tuner 415 used in the present embodiment is provided with a target index number (Index #) that corresponds with CATV channels, as shown below in Table 1. The purpose for pointing out these index numbers is to show that CATV channels have not been introduced in an orderly fashion. For example, CATV channel 95 (Index #5) is lower in frequency than CATV channel 14 (Index #10). Accordingly, the present microprocessor 310 controls the tuner 415 based on an index number that increments in ascending order along with the frequencies that the index number represents. The purpose of these index numbers will become more evident below. A more powerful microprocessor 310 and/or a more complex software control may use an alternate method to selecting channels other than the index of channels, shown below.

TABLE 1

| Index # | Channel Designator | Channel Bandwidth | |
|---|---|---|---|
| | | Low end | High End |
| 0 | 2 | 54 | 60 |
| 1 | 3 | 60 | 66 |
| 2 | 4 | 66 | 72 |
| 3 | 5 | 76 | 82 |
| 4 | 6 | 82 | 88 |
| 5 | A-5 (95) | 90 | 96 |
| 6 | A-4 (96) | 96 | 102 |
| 7 | A-3 (97) | 102 | 108 |
| 8 | A-2 (96) | 108 | 114 |
| 9 | A-1 (99) | 114 | 120 |
| 10 | A (14) | 120 | 126 |
| 11 | B (15) | 126 | 132 |
| 12 | C (16) | 132 | 138 |
| 13 | D (17) | 138 | 144 |
| 14 | E (18) | 144 | 150 |
| 15 | F (19) | 150 | 156 |
| 16 | G (20) | 156 | 162 |
| ~ ... | ~ ... | ~ ... | ~ ... |
| 94 | C91 | 624 | 630 |
| 95 | C92 | 630 | 636 |
| 96 | C93 | 636 | 642 |
| 97 | C94 | 642 | 648 |
| 98 | C100 | 648 | 654 |
| 99 | C101 | 654 | 660 |
| 100 | C102 | 660 | 666 |
| 101 | C103 | 666 | 672 |
| 102 | C104 | 672 | 678 |
| 103 | C105 | 678 | 684 |
| 104 | C106 | 684 | 690 |
| 105 | C107 | 690 | 696 |
| 106 | C108 | 696 | 702 |
| 107 | C109 | 702 | 708 |
| 108 | C110 | 708 | 714 |
| 109 | C111 | 714 | 720 |
| ~ ... | ~ ... | ~ ... | ~ ... |

The output voltage stream from the tuner 415 is typical of tuners in that the voltage stream is arranged in the frequency domain, and in that the voltage stream is a 6 MHz spectrum consistent with a includes a standardized analog television channel regardless of the frequencies of the channel that being observed at the time.

A relatively narrow band-pass filter 420 may be electrically connected to an output of the tuner 415. The band-pass filter 420 removes extraneous signals above and below desired frequencies (e.g., a vertical synchronization frequency) provided by the tuner 415. Alternatively, the band-pass filter 420 may be replaced by a narrow low-pass filter, as the vertical synchronization frequency is modulated low within the range of frequencies in accordance with NTSC. Similarly, the band-pass filter 420 may be replaced by a high-pass filter that removes extraneous signals below other desired frequencies provided by the tuner, such as the horizontal synchronization frequency. It should be understood that differing frequencies may need to be selected depending on the analog modulation scheme (e.g., NTSC, PAL, SECAM, etc.) expected. A resulting frequency domain voltage stream is then passed to an RF detector 425.

The RF detector 425 converts the frequency domain voltage stream passed from the low-pass filter 420 into a time domain voltage stream. More specifically, the RF detector 425 performs the effect of an inverse Laplace transform, the Laplace transform being a widely used integral transform, to make the transition from the frequency domain to the time domain. The inverse Laplace transform is given the following complex integral, which is known by various names, the Bromwich integral, the Fourier-Mellin integral, and Mellin's inverse formula. An alternate formula for the inverse Laplace transform is given by Post's inversion formula. Accordingly, any other device capable of such a conversion from the frequency domain to the time domain may be used in place of the RF detector 425. Afterward, the time domain voltage stream is passed to both a synchronization detector 430 ("sync detector 430") and a low frequency level detector 445.

The sync detector 430 synchronizes with voltage streams having a relatively continuous repetition, such as a continuous 30 Hz tone. Without such a continuous tone, the sync detector 430 provides a random output voltage stream. The voltage stream output, either random or synchronous, is then passed to a low-pass filter 435.

The low-pass filter 435 is provided to attenuate high frequencies which may appear like synchronous frequencies to a peak detector 440. The low-pass filter 435 may be configured such that it allows frequencies up to at least 30 Hz to include desired sync frequencies and to exclude those above the desired frequencies. The low-pass filter 435 may also include an input blocking capacitor to exclude very low frequencies.

The peak detector 440 produces a relatively consistent voltage stream when a voltage stream including synchronous voltages is provided from the sync detector 430 and the low-pass filter 435. In the presence of a voltage stream including random, non-synchronous voltages, the peak detector 440 is unable to produce a voltage stream that is consistently a significant voltage above ground. The peak detector 440 may also be referred to as a level detector and/or an integrator performing a similar function.

A resulting voltage stream from the peak detector 440 is input along a path 325 into the microprocessor 310 as a signal that discriminates between analog modulation channels and digital modulation channels. More specifically, the voltage stream from the peak detector 440 indicates that the tuner 415 is tuned to an analog modulation channel when the voltage stream is consistently a significant voltage above ground. Conversely, the voltage stream from the peak detector 440 indicates that the tuner 415 is tuned to a digital modulation channel when the voltage stream is consistently near ground.

As mentioned above, the voltage stream from the RF detector 425 is also passed to the low frequency level detector 445, which helps to maintain a voltage level from the RF detector for a longer period of time. In other words, voltages within the voltage stream are held (from falling) at their particular rate for a duration longer than in the original voltage stream passed into the level detector 445. The voltage stream from the low frequency level detector 445 and integration capacitor RF detector 425 is then input into a DC shift amplifier 450. The low frequency level detector 445 may also be known as a peak detector.

The DC shift amplifier 450 may be used as a low pass amplifier to provide a voltage stream that has been shifted in scale by a known amount to render the signal voltages appropriate for the microprocessor 310. The amount of voltage shift and/or amplification is determined by a voltage source 480 connected to the DC shift amplifier 450 by an adjustable attenuator 485. Accordingly, the DC shift amplifier 450 may also be known as a low-pass amplifier. A portion of the voltage stream from the DC shift amplifier 450 is passed back to the tuner 415 that adjusts a total system gain. This voltage stream holds the tuner output at a constant level. Additionally, a portion of the voltage stream from the DC shift amplifier 450 is passed to a high-gain amplifier 455, and a portion of the voltage stream from the DC shift amplifier 450 is passed to a low-gain amplifier 460.

The high-gain amplifier 455 is provided with the voltage stream from the DC shift amplifier 450 to function as a voltage comparator. This arrangement provides a voltage stream provided in a path 315 to the microprocessor 310 to identify the occurrence of a transmitted channel present at the index number tuned by the tuner 415.

The low-gain amplifier 460 is also provided with the voltage stream from the DC shift amplifier 450. The voltage stream created by the low-gain amplifier 450 is shifted in response to the voltage source 480, which is connected to the low-gain amplifier 450 via an adjustable attenuator 485. The resulting voltage stream from the low-gain amplifier 460 is a relative to the level of the channel at the tuned index number. This arrangement provides a voltage stream provided in a path 320 to the microprocessor 310 to identify the level of a transmitted channel present at the index number tuned by the tuner 415.

For a more detailed description of the hardware and operation of the hardware used to generate the respective voltage streams along the path 530, the path 542, and the path 548, please refer to U.S. Ser. No. 12/576,278, an entirely of which is incorporated herein by reference.

The remaining portions, discussed below, of the downstream section 108 help to perform the downstream conditioning functions at the direction of the microprocessor 310. The control sequences of these devices will be discussed more fully below, but the functionality of the hardware will be discussed here in detail first.

An amplifier 360 may be provided at or near a first location, in terms of the flow of the downstream bandwidth, in the downstream section 108. The amplifier 360 may perform at least two functions. First, amplifier 360 may add additional level to the downstream bandwidth to account for inherent attenuation in the diplexer 265, the switch 255 and so on. Second, the amplifier 360 may add some or all of the amplification needed to correct the level and slope of the downstream bandwidth as part of an output compensation circuit. For example, in the embodiment shown the amplifier 360 is a fixed output design (i.e., not controlled by the microprocessor 310), while an adjacent variable attenuator 350 is controlled by the microprocessor 310. As would be understood by one skilled in the art, a gain of 10 db may be realized by including a fixed 24 db amplifier and 14 db of attenuation. Along these lines, it should be understood that the combination of the amplifier 360 and the variable attenuator 350 is only one method of configuring an output compensation circuit that may be used to vary an amplification/level. There are many other configurations that could result in variable amplification. For example, the same desired amplification may be possible using a variable amplifier with no subsequent attenuation device. Further, any of the known adjustable gain control ("AGC") circuits may replace the amplifier 360 and the variable attenuator 350.

A slope adjustment circuit 335 is also provided. The slope adjustment circuit 335 varies the slope of the downstream bandwidth in response to a voltage provided from a rectifier 330. The slope adjustment circuit 335 provides a non-linear amount of attenuation that resembles the curve of inherent attenuation caused by the passage of the downstream bandwidth through traditional signal cables. More specifically, the slope adjustment circuit 335 provides a non-linear attenuation where the higher frequencies are attenuated less than lower frequencies, the non-linear curve being similar to the attenuation curve resulting from the signal cable. Accordingly, a downstream bandwidth having a characteristic slope after passing a length through signal cable (the slope being a non-liner curve with greater attenuation of the higher frequencies) may be made flat, or be made with a slight upward slope with the slope adjustment circuit 335.

Importantly, the slope adjustment circuit 335 does not provide amplification to the downstream bandwidth in order to flatten the levels across the downstream bandwidth. Instead, the slope adjustment circuit 335 attenuates the frequencies having higher levels. Accordingly, the presence of at least one amplifier 360, 355 and some form of control for the amplifiers 360, 355 (e.g., the variable attenuator 350) will be required to condition the downstream bandwidth in terms of slope and level.

The slope adjustment circuit 335 used in the embodiment represented in FIG. 3 varies the slope based on voltage. Because the microprocessor 310 used in the embodiment does not precisely output varying voltages, pulse width modulation (PWM) is used to control the slope adjustment 335. The PWM signal output by the microprocessor 310 is converted in to a correspondingly varying voltage by the rectifier 330, which may also be an integrator. A reference voltage is provided to the slope adjustment circuit 335 by a voltage source 340. The PWM signal may be replaced with a digital control with an analog output, as would be understood by one skilled in the art provided with the present description.

Now, the remainder of the description relates to the microprocessor 310, and how it uses the information provided to correct the level and slope of the downstream bandwidth.

A first, relatively important step is to calibrate the downstream device 100. While the calibration itself may not be important, the description of the calibration helps to introduce a number of terms useful for the remainder of the description. The calibration is accomplished by attaching the downstream device 100 to a matrix generator, which provides the downstream device with at least two known levels, such as 0 dBmV and 20 dBmV, at every index number. The calibration sequence proceeds with the tuner 415 incrementing through each index number (from the chart provided above) and obtaining a calibration level for each index number. In the present embodiment, this calibration level is saved as a digital value between 0 and 255. The following is a chart of sample calibration levels, the values being chosen for exemplary purposes only:

TABLE 2

| Index # | Channel Designator | Calibration Level | |
|---|---|---|---|
| | | Low end 0 dBmV | High End 20 dBmV |
| 0 | 2 | 155 | 210 |
| 1 | 3 | 165 | 225 |
| 2 | 4 | 155 | 218 |
| 3 | 5 | 160 | 223 |
| 4 | 6 | 155 | 214 |
| 5 | A-5 (95) | 148 | 205 |
| 6 | A-4 (96) | 168 | 224 |
| 7 | A-3 (97) | 168 | 231 |
| 8 | A-2 (96) | 159 | 217 |
| 9 | A-1 (99) | 163 | 224 |
| 10 | A (14) | 168 | 226 |
| 11 | B (15) | 150 | 213 |
| 12 | C (16) | 163 | 226 |
| 13 | D (17) | 167 | 224 |
| 14 | E (18) | 167 | 228 |
| 15 | F (19) | 161 | 224 |
| 16 | G (20) | 149 | 220 |
| ~... | ~... | ~... | ~... |
| 94 | C91 | 163 | 231 |
| 95 | C92 | 166 | 220 |
| 96 | C93 | 162 | 219 |
| 97 | C94 | 148 | 208 |
| 98 | C100 | 175 | 218 |
| 99 | C101 | 162 | 212 |
| 100 | C102 | 163 | 211 |
| 101 | C103 | 172 | 235 |
| 102 | C104 | 172 | 231 |
| 103 | C105 | 158 | 202 |
| 104 | C106 | 162 | 218 |
| 105 | C107 | 151 | 209 |
| 106 | C108 | 161 | 217 |
| 107 | C109 | 163 | 213 |
| 108 | C110 | 168 | 215 |
| 109 | C111 | 159 | 216 |
| ~... | ~... | ~... | ~... |

Even though two calibration values are shown below for each channel, it is possible to use only one calibration value for each, with at least one assumption. For example, one calibration value only may be used if/when an assumed increment is used for voltage changes. Alternatively, more than two calibration values may be used to ensure even more accurate measurements and correction, but at the expense of greater complexity.

Based on the obtained calibration values, goals for level and slope may be obtained through interpolation of the calibration values. For example, if a CATV provider determines that the levels should be 12 dBmV (or 14 dBmV) for the channels with no upward slope, the goals for each of the channels may be as follows:

TABLE 3

| Index # | Channel Designator | Interpolated Goals | |
|---|---|---|---|
| | | 12 dBmV | 14 dBmV |
| 0 | 2 | 188 | 194 |
| 1 | 3 | 201 | 207 |
| 2 | 4 | 193 | 199 |
| 3 | 5 | 198 | 204 |
| 4 | 6 | 190 | 196 |
| 5 | A-5 (95) | 182 | 188 |
| 6 | A-4 (96) | 202 | 207 |
| 7 | A-3 (97) | 206 | 212 |
| 8 | A-2 (96) | 194 | 200 |
| 9 | A-1 (99) | 200 | 206 |
| 10 | A (14) | 203 | 209 |
| 11 | B (15) | 188 | 194 |
| 12 | C (16) | 201 | 207 |
| 13 | D (17) | 201 | 207 |
| 14 | E (18) | 204 | 210 |
| 15 | F (19) | 199 | 205 |
| 16 | G (20) | 192 | 199 |
| ~... | ~... | ~... | ~... |
| 94 | C91 | 204 | 211 |
| 95 | C92 | 198 | 204 |
| 96 | C93 | 196 | 202 |
| 97 | C94 | 184 | 190 |
| 98 | C100 | 201 | 205 |
| 99 | C101 | 192 | 197 |
| 100 | C102 | 192 | 197 |
| 101 | C103 | 210 | 216 |
| 102 | C104 | 207 | 213 |
| 103 | C105 | 184 | 189 |
| 104 | C106 | 196 | 201 |
| 105 | C107 | 186 | 192 |
| 106 | C108 | 195 | 200 |
| 107 | C109 | 193 | 198 |
| 108 | C110 | 196 | 201 |
| 109 | C111 | 193 | 199 |
| ~... | ~... | ~... | ~... |

Similarly, if a CATV provider determines that they would like a 12 dBmV to 14 dBmV upward slope between 54 MHz and 1000 MHz to the downstream bandwidth, the following values could be interpolated as goals:

TABLE 4

| | | Interpolated Goals for 12 dBmV-14 dBmV Upslope Between 54 MHz and 1000 MHz | |
|---|---|---|---|
| Index # | Channel Designator | dBmV | Value |
| 0 | 2 | 12.0000 | 188 |
| 1 | 3 | 12.0127 | 201 |
| 2 | 4 | 12.0255 | 193 |
| 3 | 5 | 12.0382 | 198 |
| 4 | 6 | 12.0510 | 191 |
| 5 | A-5 (95) | 12.0637 | 182 |
| 6 | A-4 (96) | 12.0764 | 202 |
| 7 | A-3 (97) | 12.0892 | 206 |
| 8 | A-2 (96) | 12.1019 | 194 |
| 9 | A-1 (99) | 12.1146 | 200 |
| 10 | A (14) | 12.1274 | 203 |
| 11 | B (15) | 12.1401 | 188 |
| 12 | C (16) | 12.1529 | 201 |
| 13 | D (17) | 12.1656 | 202 |
| 14 | E (18) | 12.1783 | 204 |
| 15 | F (19) | 12.1911 | 199 |
| 16 | G (20) | 12.2038 | 192 |
| ~... | ~... | ~... | ~... |
| 94 | C91 | 13.2102 | 208 |
| 95 | C92 | 13.2229 | 202 |
| 96 | C93 | 13.2357 | 200 |
| 97 | C94 | 13.2484 | 188 |
| 98 | C100 | 13.2611 | 204 |
| 99 | C101 | 13.2739 | 195 |
| 100 | C102 | 13.2866 | 195 |
| 101 | C103 | 13.2994 | 214 |
| 102 | C104 | 13.3121 | 211 |
| 103 | C105 | 13.3248 | 187 |
| 104 | C106 | 13.3376 | 199 |
| 105 | C107 | 13.3503 | 190 |
| 106 | C108 | 13.3631 | 198 |
| 107 | C109 | 13.3758 | 196 |
| 108 | C110 | 13.3885 | 199 |
| 109 | C111 | 13.4013 | 197 |
| ~... | ~... | ~... | ~... |

It should be understood that these interpolated goals may be calculated at any time by the microprocessor 310 or may be provided to the microprocessor in table form. It is being described at this point to aid in clarifying the use of goal values and how those goal values are obtained. Depending of the software strategy and microprocessor 310, the use of goals in terms of their interpolated digital scaled value may be unnecessary. For example, the digitally scaled level value of a particular channel may be converted to a representative dBmV scale such that the goals may remain in the dBmV scale. Further, it should be understood that many of the remaining components, like the slope adjustment device 335 may be calibrated to determine an amount of response of that device in terms of an amount of input from the microprocessor 310.

Figure 4:
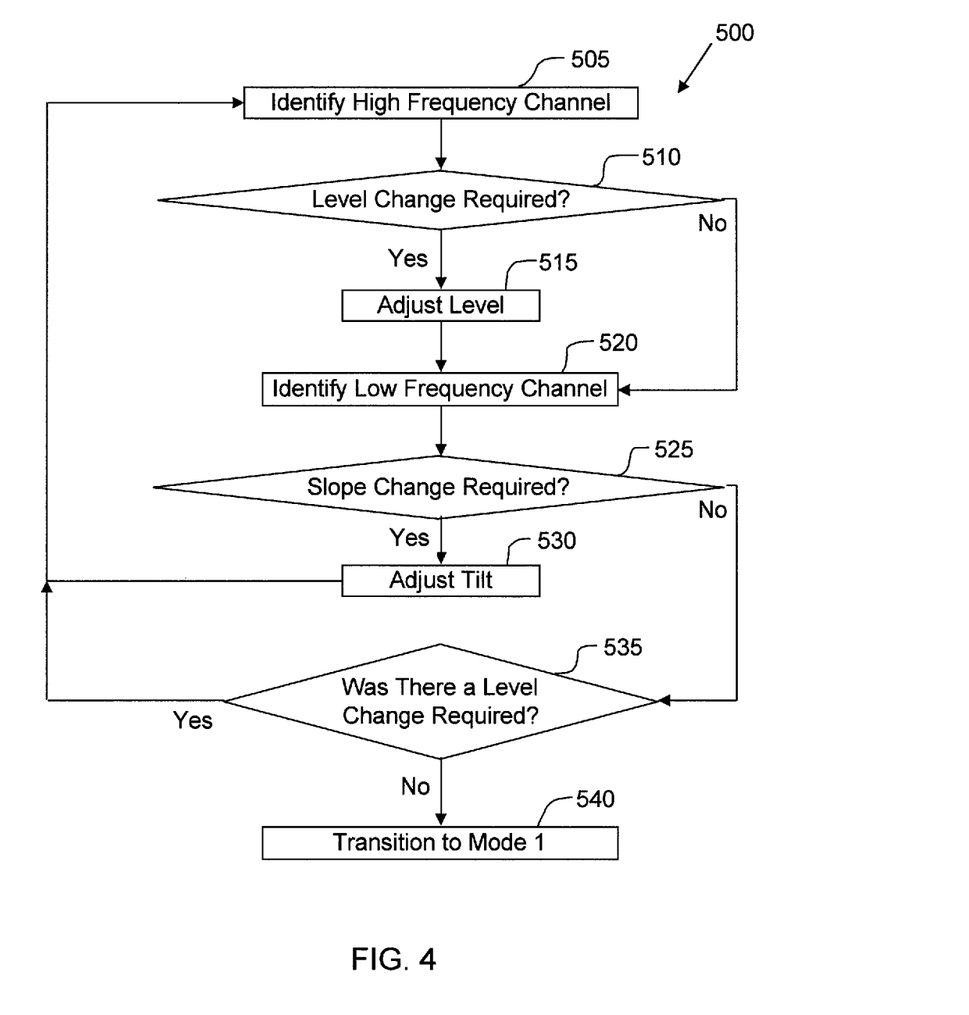
FIG. 4 is a flow chart representing a signal level measurement routine performed by a microprocessor used in a downstream device made in accordance with one embodiment of the present invention.

After calibration and in use on or proximate to a premise of a user, the microprocessor 310 initiates Mode Ø, which is an initial process correcting the level of the channels and the slope in a relatively quick manner. Mode Ø will be discussed using the flow chart shown in FIG. 4 along with relative examples in FIGS. 6-9.

Figure 6:
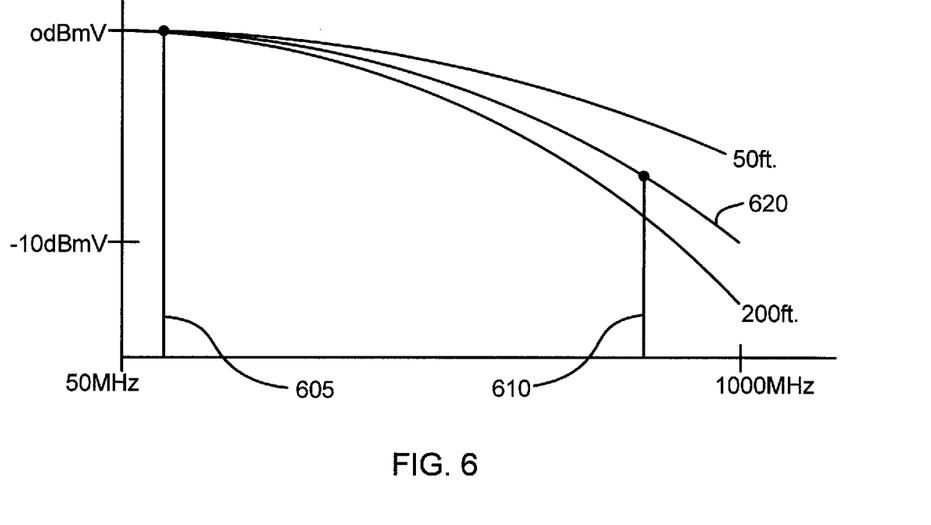
FIG. 6 is a graph representative of a level curve of a downstream bandwidth prior to a level adjustment and a slope adjustment.

According to step 505, the microprocessor 310 attempts to identify a high frequency channel 610 (FIG. 6). The microprocessor 310 first attempts to identify the high frequency channel 610 at Index #103. If no channel is found at Index #103, the microprocessor 310 then begins to scan at Index #105 and indexes down until a high frequency channel 610 is identified as being present. The particular index number used may be different in other embodiments. However, it is important to identify a channel as being present because a channel should be present to obtain accurate level values. In a representative CATV system, it was found that there are typically channels present in the range of Index #101 to 105. Accordingly, these index numbers should be changed to a location where channels are typically present in a particular CATV system, if needed.

The microprocessor 310 then obtains a level measurement for the identified channel. If the microprocessor 310 determines that the identified channel is digital, through the method described above, the microprocessor 310 will add or subtract 10 dBmV to or from the measured Level and/or goal level for that channel. The associated digital value for an offset of 10 dBmV is shown in the Table below.

TABLE 5

|  |  | Interpolated Values per dBmV Goals | |
| --- | --- | --- | --- |
| Index # | Channel Designator | 1 dBmV | 10 dBmV |
| 0 | 2 | 2.75 | 27.5 |
| 1 | 3 | 3.00 | 30.0 |
| 2 | 4 | 3.15 | 31.5 |
| 3 | 5 | 3.15 | 31.5 |
| 4 | 6 | 2.95 | 29.5 |
| 5 | A-5 (95) | 2.85 | 28.5 |
| 6 | A-4 (96) | 2.80 | 28.0 |
| 7 | A-3 (97) | 3.15 | 31.5 |
| 8 | A-2 (96) | 2.90 | 29.0 |
| 9 | A-1 (99) | 3.05 | 30.5 |
| 10 | A (14) | 2.90 | 29.0 |
| 11 | B (15) | 3.15 | 31.5 |
| 12 | C (16) | 3.15 | 31.5 |
| 13 | D (17) | 2.85 | 28.5 |
| 14 | E (18) | 3.05 | 30.5 |
| 15 | F (19) | 3.15 | 31.5 |
| 16 | G (20) | 3.55 | 35.5 |
| ~... | ~... | ~... | ~... |
| 94 | C91 | 3.40 | 34.0 |
| 95 | C92 | 2.70 | 27.0 |
| 96 | C93 | 2.85 | 28.5 |
| 97 | C94 | 3.00 | 30.0 |
| 98 | C100 | 2.15 | 21.5 |
| 99 | C101 | 2.50 | 25.0 |
| 100 | C102 | 2.40 | 24.0 |

TABLE 5-continued

|  |  | Interpolated Values per dBmV Goals | |
| --- | --- | --- | --- |
| Index # | Channel Designator | 1 dBmV | 10 dBmV |
| 101 | C103 | 3.15 | 31.5 |
| 102 | C104 | 2.95 | 29.5 |
| 103 | C105 | 2.20 | 22.0 |
| 104 | C106 | 2.80 | 28.0 |
| 105 | C107 | 2.90 | 29.0 |
| 106 | C108 | 2.80 | 28.0 |
| 107 | C109 | 2.50 | 25.0 |
| 108 | C110 | 2.35 | 23.5 |
| 109 | C111 | 2.85 | 28.5 |
| ~... | ~... | ~... | ~... |

Once any offset is applied, the microprocessor 310 determines whether any adjustment is required. In Mode Ø, threshold values are set to determine whether to adjust the level and how much level to adjust. In the present embodiment those thresholds and adjustment amounts are as follows:

TABLE 6

| State | Thresholds | Level Adjustment Amounts |
| --- | --- | --- |
| Ø | 0 ≦ Distance from goal in dBmV < 3 dBmV | No Change |
| 1 | 3 ≦ Distance from goal in dBmV < 12 dBmV | 2 dBmV |
| 2 | 12 ≦ Distance from goal in dBmV < 40 dBmV | 8 dBmV |
| 3 | 40 ≦ Distance from goal in dBmV | 24 dBmV |

Figure 7:
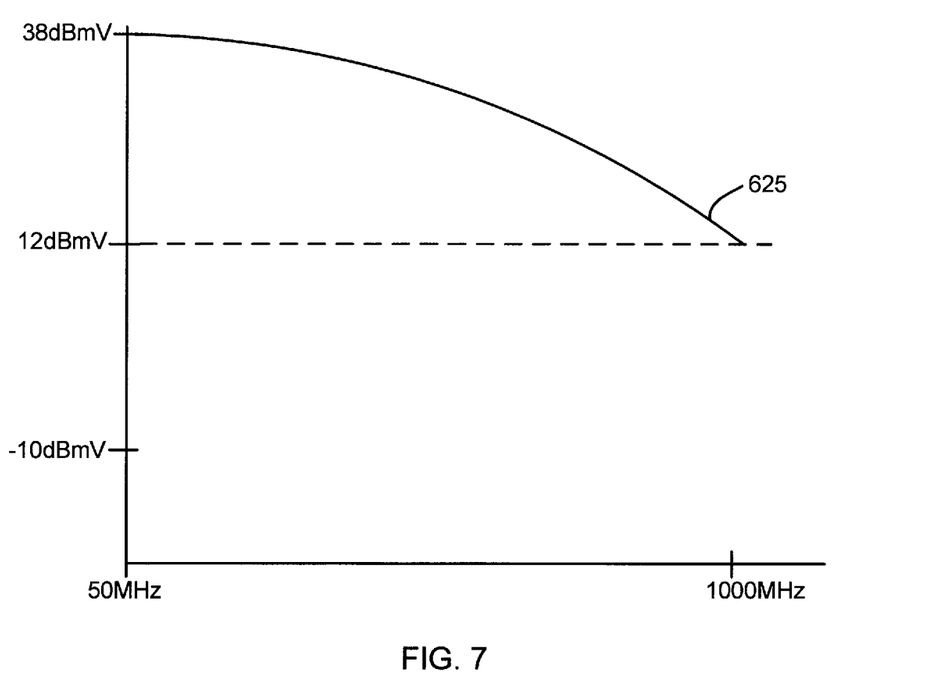
FIG. 7 is a graph representative of a level curve of a downstream bandwidth after a level adjustment and before a slope adjustment.

According to step 510, if the distance from the goal in dBmV falls into any one of States 1-3, the microprocessor 310 moves to step 515 and adjusts the level according to the Table 6 above. If the distance from the goal in dBmV falls into State Ø, the microprocessor moves to step 520. As an example of the level adjustment, a level curve 620 in FIG. 6 is linearly amplified such that a similar level curve 625 (FIG. 7) results. The deference between level curve 620 and 625 is primarily the level, with the level at 1000 MHz being positioned in FIG. 7 at a goal level of 12 dBmV. While it is shown in FIGS. 6 and 7 that the level has been increased over 20 dBmV, this large amount of level adjustment would not be accomplished in one step according to Table 6. This large of an increase in level has been shown in FIGS. 6 and 7 for clarity purposes only.

According to step 520, the microprocessor 310 seeks to identify a low frequency channel 605 (FIG. 6). To do this, the microprocessor 310 first directs the tuner 415 to Index #14. If there is no channel identified at Index #14, the microprocessor then scans through Index #s 12-16 until a channel has been identified. Similar to above, the actual index number/channel is not important. Rather it is important to identify at least one channel in the lower frequency portion of the downstream bandwidth. After a channel is identified, the microprocessor 310 will obtain a level of that channel and will add 10 dBmV to the level if it is a digital channel.

According to step 525, the microprocessor 310 determines whether any slope changes are required. Similar to above, In Mode Ø, threshold values are set to determine whether to adjust the slope and how much slope to adjust. In the present embodiment those thresholds and adjustment amounts are as follows:

TABLE 7

| State | Thresholds | Slope Adjustment Amounts |
|---|---|---|
| Ø | 0 ≤ Distance from goal in dBmV < 3 dBmV | No Change |
| 1 | 3 ≤ Distance from goal in dBmV < 12 dBmV | 2 dBmV |
| 2 | 12 ≤ Distance from goal in dBmV < 40 dBmV | 8 dBmV |
| 3 | 40 ≤ Distance from goal in dBmV | 24 dBmV |

Figure 8:
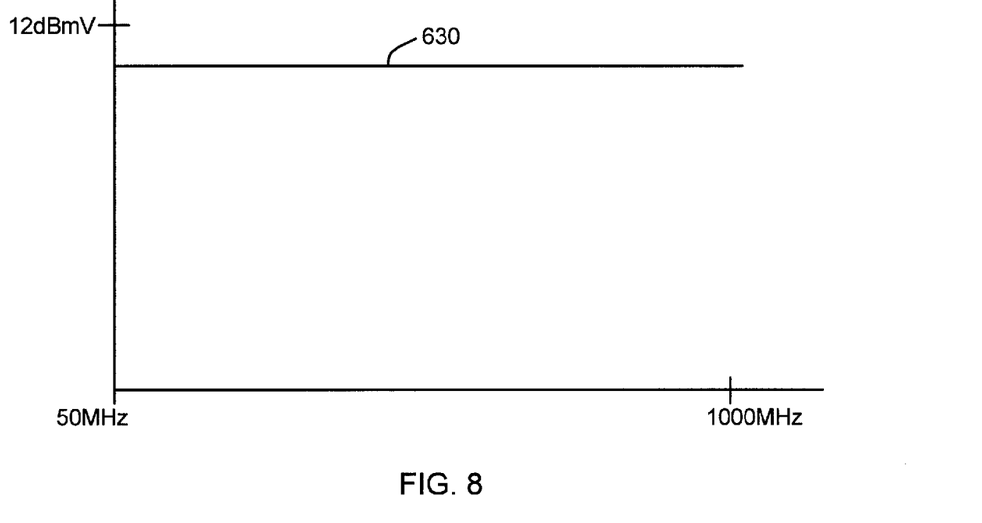
FIG. 8 is a graph representative of a level curve of a downstream bandwidth after a level adjustment and after a slope adjustment, the slope adjustment resulting in a constant 12 dBmV level curve.
Figure 9:
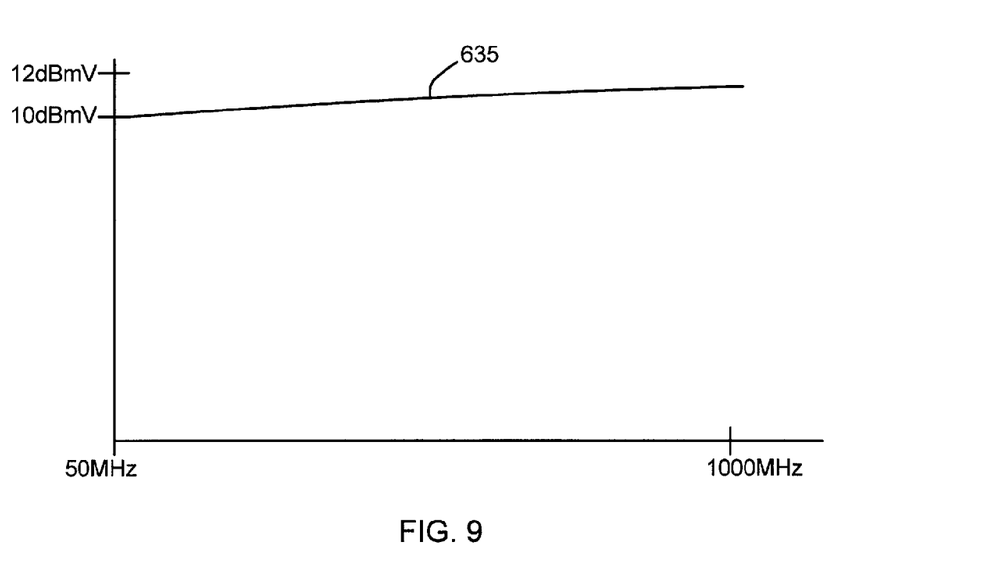
FIG. 9 is a graph representative of a level curve of a downstream bandwidth after a level adjustment and after a slope adjustment, the slope adjustment resulting in an upward slope of 2 dBmV between 54 MHz and 1000 MHz.

According to step 525, if the distance from the goal in dBmV falls into any one of States 1-3, the microprocessor 310 moves to step 530 and adjusts the slope according to the Table 7 above. If the distance from the goal in dBmV falls into State Ø, the microprocessor moves to step 535. As shown in FIGS. 7 and 8, the level curve 625 is attenuated in a non-linear manner to form a level curve 630 that is shown as being level at 12 dBmV across the frequency range of 54 MHz to 1000 MHz. Similarly, the level curve 625 could be attenuated in a non-linear manner to form a level curve 635 that is shown in FIG. 9 as having an upward slope of 2 MHz between 54 MHz and 1000 MHz. While the level curves 630, 635 are shown as straight lines for clarity purposes, these curves may have many variances between 54 MHz and 1000 MHz.

According to step 535, the microprocessor 310 determines whether any adjustments made to either the level or the slope in the present run through process 500. If there were changes, the microprocessor 310 will return to step 505 and reiterate the process 500. If there were no adjustments made, the microprocessor 310 will proceed to Mode 1.

Figure 5:
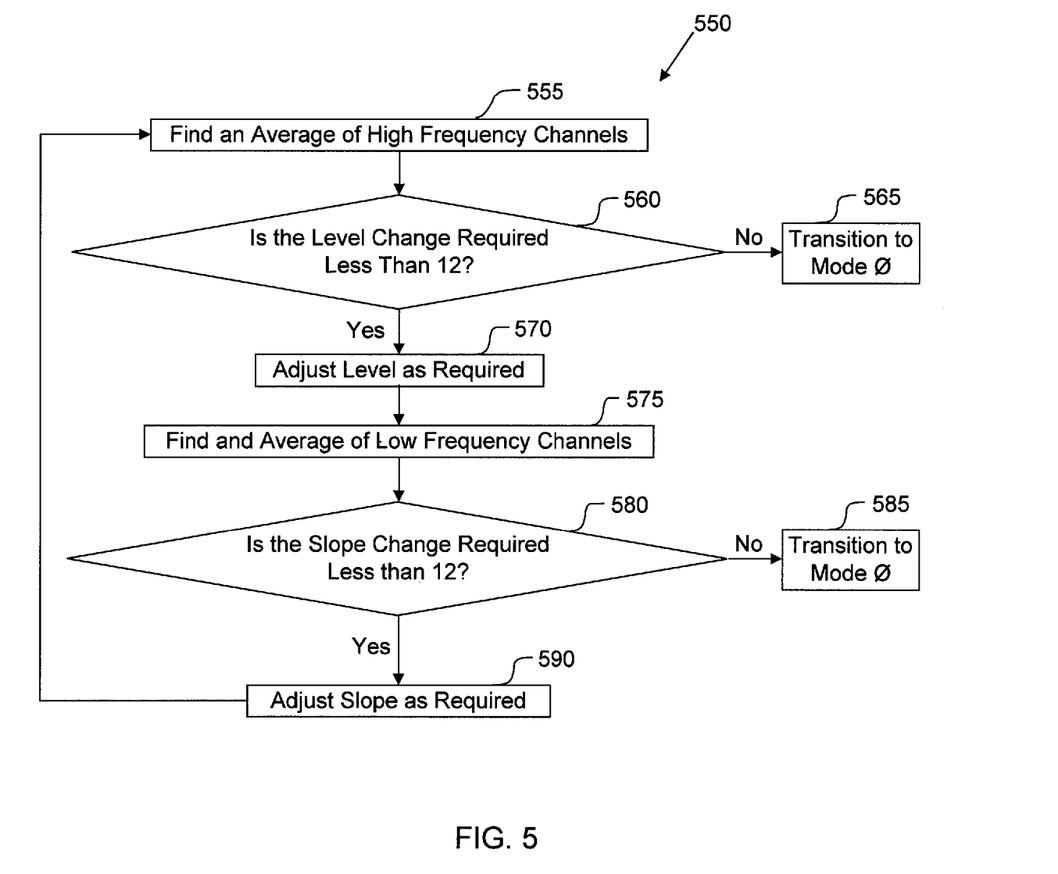
FIG. 5 is a flow chart representing a signal level measurement routine performed by a microprocessor used in a downstream device made in accordance with one embodiment of the present invention.

Referring now to FIG. 5, Mode 1 is similar to Mode Ø in that high frequency channels 610 and low frequency channels 605 are sought for the purpose of setting the level and the slope of the downstream bandwidth. The primary difference is that Mode 1 seeks to "fine tune" the level and slope adjustments by using an average of more than one channel. This approach may not be used in Mode Ø, because of the time required to gather the information needed from a larger quantity of channels. If timing and quick reactions are not a concern, Mode 1 could be used in place of Mode Ø.

According to step 555, the microprocessor 310 finds an average of more than one high frequency channels. In one embodiment of the downstream section 108, the microprocessor 310 will start at an index number that is five below the starting channel from Mode Ø and stop at an index number that is five above the starting channel from Mode Ø. In other words, the microprocessor 310 will begin collecting channel information at Index #97 (i.e., 103–5) and stop collecting channel information at Index #109 (i.e., 103+5). The microprocessor 310 may also chose the channels based on the index number representing the channel actually identified in Mode Ø, if Index #103 did not contain an identifiable channel. Further, it should be understood that less channels may be collected if there is a benefit or a requirement that the process is to be accomplished more quickly. Alternatively, more channels may be collected when or if the process is allowed to take more time (i.e., more time than with less channels). In other words, less channels may be collected if adjacent channels in a particular CATV system are consistent (i.e. not varying in a random manner), because the benefit of averaging more channels (e.g., smoothing the effects of randomly varying levels in adjacent channels) may be outweighed by the time required to select and measure channels. Similarly, more channels may be collected if adjacent channels in a particular CATV system are greatly varying in a random manner, because the additional time required to select and measure the channels may be outweighed by the additional accuracy obtained by averaging more channels.

Based on the averages of the levels and the goals for the identified channels within the index numbers scanned, the microprocessor 310 will move to step 560 to determine whether any level adjustments are required. If there are index numbers in the range that do not contain identifiable channels, those channels will not be included in terms of average level or average goal. Further, if the microprocessor 310 determines that there are not enough channels in order to obtain a reasonable average, such as a 5 channel average in one embodiment, then the downstream device 100 may not advance into Mode 1 at all, but remain in Mode Ø.

According to step 560, the microprocessor 310 determines whether any level adjustment is required. In Mode 1, threshold values are set to determine whether to adjust the level and how much level to adjust. In the present embodiment those thresholds and adjustment amounts are as follows:

TABLE 8

| State | Thresholds | Level Adjustment Amounts |
|---|---|---|
| Ø | 0 ≤ Distance from goal in dBmV < 3 dBmV | No Change |
| 1 | 3 ≤ Distance from goal in dBmV < 12 dBmV | 1 dBmV |
| 2 | 12 ≤ Distance from goal in dBmV | Return to Mode Ø |

Further according to step 560, if the distance from the goal in terms of dBmV falls into any one of States 1, the microprocessor 310 moves to step 570 and adjusts the level according to the Table 8 above. If the distance from the goal in terms of dBmV falls into State 2, the microprocessor moves to step 565, which is to return to Mode Ø. The return to Mode Ø is required in this instance, because the amount of adjustment required may take too long to account for the rapid change that occurred somewhere between the supplier 20 and the downstream device 100. Accordingly, such a return to Mode 0 is a purposeful reaction to what appears to be a rapid change in level, such as when a cable is damaged or an amplifier has rapidly failed.

The microprocessor 310 may then move to step 575, where it finds an average of more than one low frequency channels. In one embodiment of the downstream device 100, the microprocessor 310 will start at an index number that is two below the starting channel from Mode Ø and stop at an index number that is two above the starting channel from Mode Ø. In other words, the microprocessor 310 will begin collecting channel information at Index #12 (i.e., 14–2) and stop collecting channel information at Index #16 (i.e., 14+2). The microprocessor 310 may also chose the channels based on the index numbers representing the channel actually identified in Mode Ø, if Index #14 did not contain an identifiable channel. The downstream device 100 attempts to collect only five low frequency channels as opposed to eleven high frequency channels in light of the fact that low frequency channels appear to be more consistently present and more consistent in term of level. It should be understood that more or less channels may be collected if speed is a problem and/or if the channels in a particular CATV system are more or less consistent.

Based on the averages of the levels and the goals for the identified channels within the index numbers scanned, the microprocessor 310 will move to step 580 to determine whether any slope adjustments are required. If there are index numbers in the range that do not contain identifiable channels, those channels will not be included in terms of average level or average goal.

According to step 580 the microprocessor 310 determines whether any slope adjustment is required. In Mode 1, threshold values are set to determine whether to adjust the slope and how much level to adjust. In the present embodiment those thresholds and adjustment amounts are as follows:

TABLE 9

| State | Thresholds | Slope Adjustment Amounts |
|---|---|---|
| Ø | 0 ≦ Distance from goal in dBmV < 3 dBmV | No Change |
| 1 | 3 ≦ Distance from goal in dBmV < 12 dBmV | 1 dBmV |
| 2 | 12 ≦ Distance from goal in dBmV | Return to Mode Ø |

According to step 580, if the distance from the goal in terms of dBmV falls into any one of States Ø and 1, the microprocessor 310 moves to step 590 and adjusts the slope according to Table 8 above. If the distance from the goal in terms of dBmV falls into State 2, the microprocessor moves to step 585, which is to return to Mode Ø. The return to Mode Ø is required in this instance, because the amount of adjustment required may take too long to account for the rapid change that occurred somewhere between the supplier 20 and the downstream device 100. Accordingly, such a return to Mode Ø is a purposeful reaction to what appears to be a rapid change in level, such as when a cable is damaged or an amplifier has rapidly failed.

It should be understood that minor changes may be made to the above device without significant changes to the design and or operation of the downstream section 108. Most notably, the use of the high frequency channel and the low frequency channel may be switched. More specifically, the downstream section will function normally if the low frequency channel is used to set the level and the high frequency channel is used to set the slope.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. A downstream bandwidth conditioning device that can be inserted into a transmission line of a CATV system on or proximate to a premise of a user, the device comprising:
   a supplier side connector;
   a user side connector;
   a forward path extending at least a portion of a distance between the supplier side connector and the user side connector;
   a coupler connected within the forward path, the coupler providing a secondary path;
   a tuner being connected to the coupler and being tunable based on an input from a microprocessor, the tuner providing a tuner output of a selected channel, the selected channel being at least one of a high frequency channel and a low frequency channel;
   a channel analyzer being connected to an output of the tuner, the channel analyzer providing the microprocessor with a modulation output, the modulation output differing when the selected channel is an analog modulation versus when the selected channel is a digital modulation;
   a slope adjustment circuit being connected within the forward path between the coupler and the supplier side connector, the slope adjustment device being adjustable based on an slope control output provided by the microprocessor; and
   an output compensation circuit electrically connected within the forward signal path between the coupler and the supplier side connector, the output compensation device being adjustable based on a level control output from the microprocessor, wherein the microprocessor comprises at least one control mode used to vary a slope control input and a level control input, wherein a first control mode varies at least one of the slope control input and the level control input based on a low channel level from each of at least one low frequency channel and a high channel level from each of at least one high frequency channel, wherein a second control mode varies at least one of the slope control input and the level control input based on an average of a plurality of the low channel levels, and wherein the first control mode differs at least one of the slope control input and the level control input at a faster rate than a second control mode.

2. The device of claim 1, wherein the first control mode varies at least one of the slope control input and the level control input based on a low channel level from a single low frequency channel and a high channel level from a single high frequency channel.

3. The device of claim 1, wherein the microprocessor comprises at least one control mode that compares a low channel level from the at least one low frequency channel to a respective goal level to vary the slope control input.

4. The device of claim 1, wherein the microprocessor comprises at least one calibration memory location for each of the at least one low frequency channel and for each of the at least one high frequency channel.

5. A downstream bandwidth conditioning device that can be inserted into a transmission line of a CATV system on or proximate to a premise of a user, the device comprising:
   a supplier side connector;
   a user side connector;
   a forward path extending at least a portion of a distance between the supplier side connector and the user side connector;
   a coupler connected within the forward path, the coupler providing a secondary path;
   a tuner being connected to the coupler and being tunable based on an input from a microprocessor, the tuner providing a tuner output of a selected channel, the selected channel being at least one of a high frequency channel and a low frequency channel;
   a channel analyzer being connected to an output of the tuner, the channel analyzer providing the microprocessor with a modulation output, the modulation output differing when the selected channel is an analog modulation versus when the selected channel is a digital modulation;
   a slope adjustment circuit being connected within the forward path between the coupler and the supplier side connector, the slope adjustment device being adjustable based on an slope control output provided by the microprocessor; and
   an output compensation circuit electrically connected within the forward signal path between the coupler and the supplier side connector, the output compensation device being adjustable based on a level control output from the microprocessor, wherein the microprocessor comprises at least one control mode that compares one of the low channel level and the high channel level to a respective goal level to vary the slope control input, wherein the control mode compares one of the low channel level and the high channel level to a respective goal level to vary the level control input, and wherein the control mode selectively adds a digital channel offset to the the respective goal level prior to comparing the one of the low channel level and the high channel level to the respective goal level.

6. A downstream bandwidth conditioning device that can be inserted into a transmission line of a CATV system on or proximate to a premise of a user, the device comprising:
   a supplier side connector;
   a user side connector;
   a forward path extending at least a portion of a distance between the supplier side connector and the user side connector;
   a coupler connected within the forward path, the coupler providing a secondary path;
   a tuner being connected to the coupler and being tunable based on an input from a microprocessor, the tuner providing a tuner output of a selected channel, the selected channel being at least one of a high frequency channel and a low frequency channel;
   a channel analyzer being connected to an output of the tuner, the channel analyzer providing the microprocessor with a modulation output, the modulation output differing when the selected channel is an analog modulation versus when the selected channel is a digital modulation;
   a slope adjustment circuit being connected within the forward path between the coupler and the supplier side connector, the slope adjustment device being adjustable based on an slope control output provided by the microprocessor; and
   an output compensation circuit electrically connected within the forward signal path between the coupler and the supplier side connector, the output compensation device being adjustable based on a level control output from the microprocessor, wherein the microprocessor comprises at least one control mode that compares one of the low channel level and the high channel level to a respective goal level to vary the slope control input, wherein the control mode compares one of the low channel level and the high channel level to a respective goal level to vary the level control input, and wherein the control mode selectively subtracts a digital channel offset from the goal level prior to comparing the one of the low channel level and the high channel level to the respective goal level.

7. The device of claim 3, wherein the microprocessor comprises at least one control mode that compares a high channel level of the at least one high frequency channel to a respective goal level to vary the level control input.

8. The device of claim 3, wherein the microprocessor comprises a goal memory location for each of the at least one low frequency channel and for each of the at least one high frequency channel.

* * * * *